United States Patent
Zhang

(10) Patent No.: US 9,429,044 B2
(45) Date of Patent: Aug. 30, 2016

(54) SUPERCRITICAL HEAT RECOVERY STEAM GENERATOR REHEATER AND SUPERCRITICAL EVAPORATOR ARRANGEMENT

(71) Applicant: ALSTOM Technology Ltd, Baden (CH)

(72) Inventor: Wei Zhang, South Windsor, CT (US)

(73) Assignee: ALSTOM TECHNOLOGY LTD, Baden (CH)

( * ) Notice: Subject to any disclaimer, the term of this patent is extended or adjusted under 35 U.S.C. 154(b) by 723 days.

(21) Appl. No.: 13/739,568

(22) Filed: Jan. 11, 2013

(65) Prior Publication Data
US 2013/0180228 A1    Jul. 18, 2013

Related U.S. Application Data

(60) Provisional application No. 61/586,350, filed on Jan. 13, 2012.

(51) Int. Cl.
| | | |
|---|---|---|
| *F01K 23/10* | (2006.01) | |
| *F01K 7/22* | (2006.01) | |
| *F01K 9/02* | (2006.01) | |
| *F22B 1/18* | (2006.01) | |

(52) U.S. Cl.
CPC .......... *F01K 23/10* (2013.01); *F01K 7/22* (2013.01); *F01K 9/023* (2013.01); *F22B 1/1815* (2013.01); *Y02E 20/16* (2013.01)

(58) Field of Classification Search
CPC .......... F01K 7/18; F01K 7/22; F01K 21/047; F01K 23/10; F01K 23/106; F01K 23/14; Y02E 20/16
See application file for complete search history.

(56) References Cited

U.S. PATENT DOCUMENTS

| | | | |
|---|---|---|---|
| 5,839,269 A | 11/1998 | Frutschi | |
| 6,220,013 B1 | 4/2001 | Smith | |
| 6,889,506 B2 * | 5/2005 | Grewe | F01K 23/068 60/39.094 |
| 7,874,162 B2 | 1/2011 | Tomlinson et al. | |
| 9,074,494 B2 * | 7/2015 | Pang | F01K 23/108 |
| 9,109,513 B2 * | 8/2015 | Fujita | F02C 6/18 |
| 2004/0148941 A1 | 8/2004 | Wylie | |

(Continued)

FOREIGN PATENT DOCUMENTS

| | | |
|---|---|---|
| DE | 198 34 741 | 2/2000 |
| EP | 0 516 995 A1 | 12/1992 |

(Continued)

OTHER PUBLICATIONS

US 2004/0014941 A1, 08/2004, Wylie (withdrawn)

*Primary Examiner* — Arun Goyal
(74) *Attorney, Agent, or Firm* — GE Global Patent Operation; Marc A. Vivenzio

(57) ABSTRACT

A supercritical heat recovery steam generator includes a duct defining an interior area and having a gas inlet and a gas outlet. The duct is configured to convey gas from the gas inlet to the gas outlet. A portion of the duct between the gas inlet and the gas outlet defines an exhaust gas flow segment of the interior area. A supercritical evaporator is disposed in the interior area and a reheater is disposed in the interior area. The reheater and the supercritical evaporator are disposed in the exhaust gas flow segment, adjacent to each other with respect to the flow of the exhaust gas.

18 Claims, 3 Drawing Sheets

(56) References Cited

U.S. PATENT DOCUMENTS

| | | |
|---|---|---|
| 2007/0204623 A1 | 9/2007 | Rollins, III |
| 2009/0064654 A1 | 3/2009 | Kirzhner et al. |
| 2011/0247335 A1 | 10/2011 | Schmid et al. |
| 2012/0096869 A1 | 4/2012 | Kesseli et al. |
| 2012/0102962 A1 | 5/2012 | Sivasankaran et al. |
| 2012/0167546 A1 | 7/2012 | Oomens et al. |
| 2013/0186089 A1* | 7/2013 | Bruckner .................. F01K 7/22 60/641.11 |

FOREIGN PATENT DOCUMENTS

| | | |
|---|---|---|
| EP | 0 588 392 A1 | 3/1994 |
| EP | 1 050 667 | 11/2000 |
| WO | 96/23961 | 8/1996 |

* cited by examiner

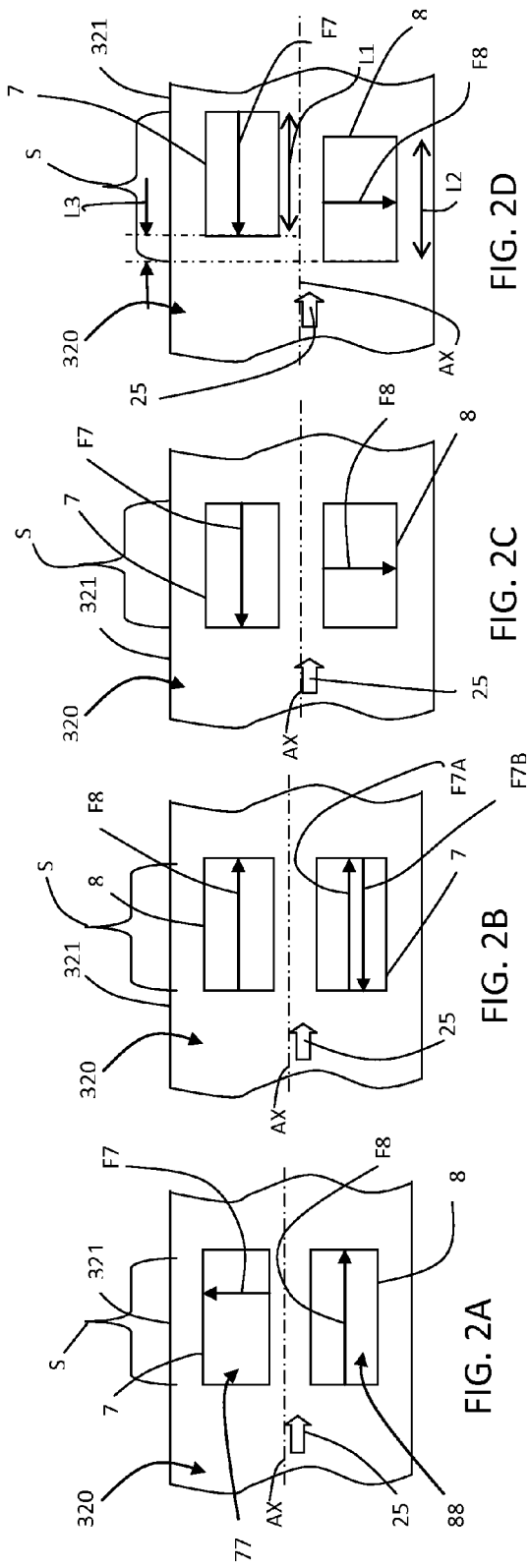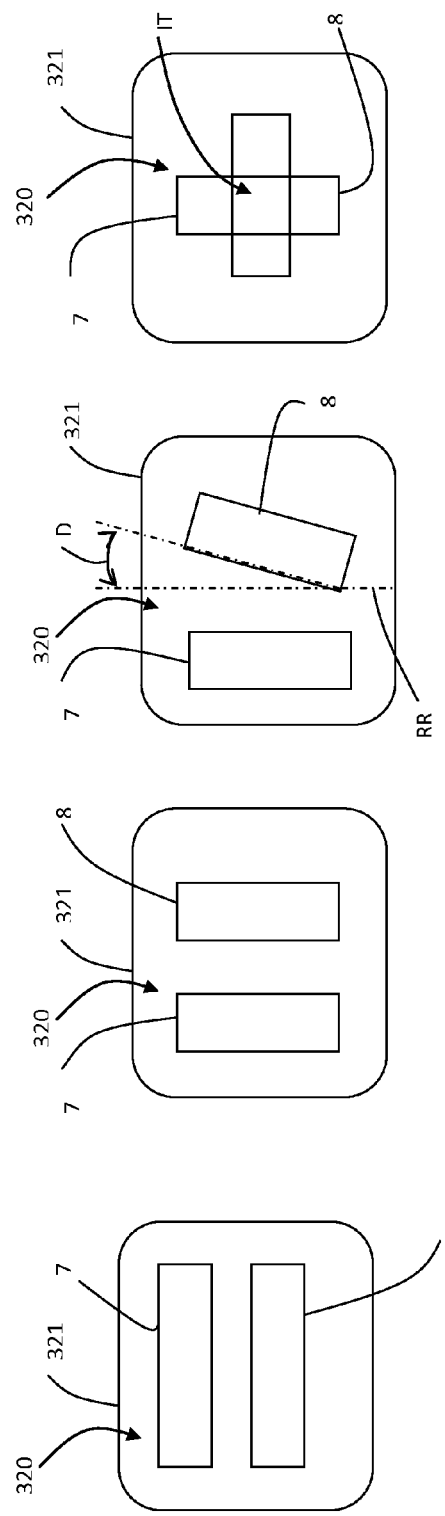

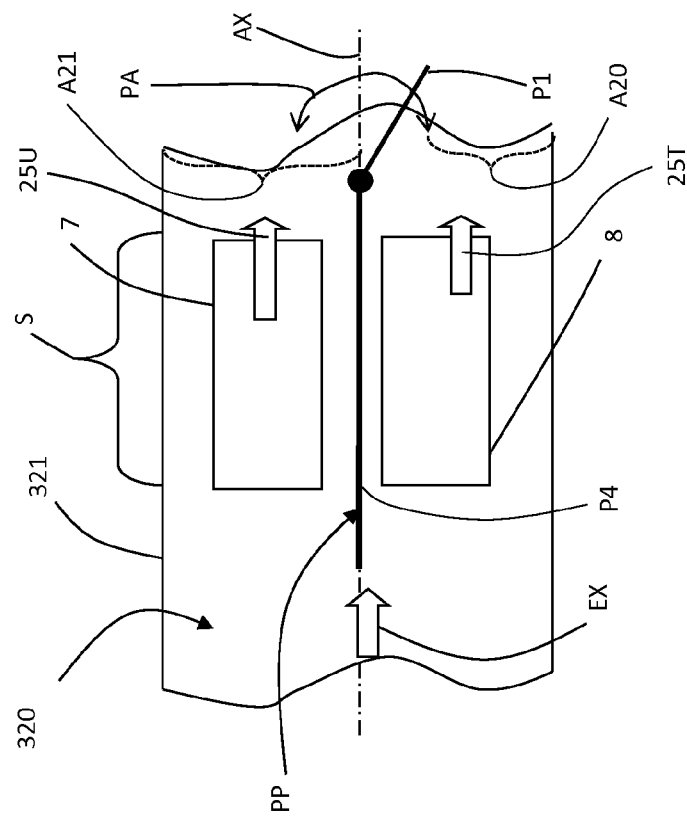
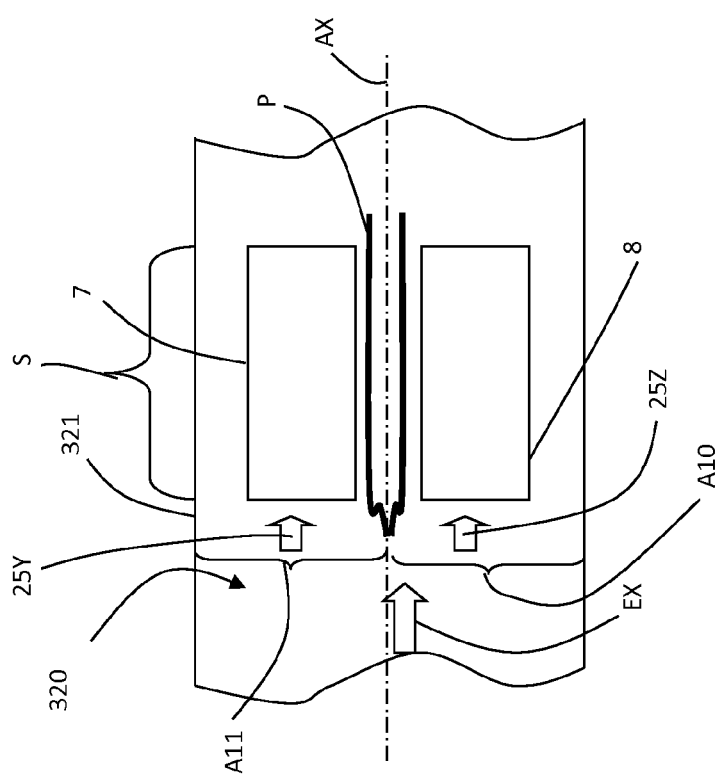

9,429,044 B2

SUPERCRITICAL HEAT RECOVERY STEAM GENERATOR REHEATER AND SUPERCRITICAL EVAPORATOR ARRANGEMENT

CROSS REFERENCE TO RELATED APPLICATION

This application claims the benefit of U.S. provisional application No. 61/586,350, filed Jan. 13, 2012, the contents of which is incorporated herein by reference in its entirety.

TECHNICAL FIELD

The present disclosure is generally directed to a heat recovery steam generator (HRSG), and more particularly, to an arrangement of a reheater and supercritical evaporator of an HRSG wherein the supercritical evaporator and a reheater are disposed in a common exhaust gas flow segment of the HRSG.

BACKGROUND

Some combined cycle power plants utilize a single heat source to run two or more heat engines. For example, some combined cycle power plants utilize a gas turbine as the heat source. The gas turbine includes a compressor coupled to a compressor positioned downstream thereof. Rotating elements of the compressor and the turbine are typically mounted on a common rotatable shaft. A combustion chamber is positioned between the compressor and the turbine. Fuel, for example natural gas, is supplied to the combustor. In the combustor, the gas is mixed with air and ignited thereby releasing energy in the form of hot and high velocity combustion gases that are admitted to and turn the rotating elements of the turbine. The turbine can be coupled to an electric generator for production of electricity. The combustion gases exiting the turbine are used in a heat recovery steam generator (HRSG) to provide useful steam for spinning another turbine system, for example a steam turbine. The steam turbine system can be coupled in tandem to the shaft of the turbine in the gas turbine system or can be a standalone unit.

The steam turbine system may include three sections, including a high pressure section, an intermediate pressure section and a low pressure section. Supercritical steam (i.e., at or above the critical point) is admitted to the high pressure section. Since at supercritical pressures and temperatures water and steam cannot be distinguished, the systems and components for collecting and transferring the supercritical steam are simplified, compared to those for handling steam below the critical point. Steam pressure requirements for intermediate pressure section and the low pressure section are successively lower than that of the high pressure section. Each of the three sections has an inlet for admission of the steam to the respective section and an outlet for discharge of steam at a lower pressure and temperature than that at the respective inlet. The pressure and temperature reduction of the steam is effected by the extraction of energy from the steam used to spin the turbine blades in that stage. The steam discharged from the outlet of the high pressure section has useful energy that can be further heated in the HRSG and subsequently supplied to the inlet of the intermediate pressure stage. Low energy steam discharged from the low pressure section is sent to a condenser where the low energy steam is cooled and condensed into condensate that is subsequently supplied to the HRSG for production of steam.

SUMMARY

According to aspects illustrated herein a there is provided a supercritical heat recovery steam generator which includes a duct defining an interior area and having a gas inlet and a gas outlet. The duct is configured to convey gas from the gas inlet to the gas outlet. A portion of the duct between the gas inlet and the gas outlet defines an exhaust gas flow segment of the interior area. A supercritical evaporator is disposed in the interior area and a first stage reheater is disposed in the interior area. The first stage reheater and the supercritical evaporator are disposed in the exhaust gas flow segment, adjacent to each other with respect to the flow of the exhaust gas, for example, in a parallel arrangement with respect to flow of exhaust gas through the supercritical heat recovery steam generator.

According to further aspects illustrated herein, there is provided a combined cycle power plant that includes a gas turbine system having an exhaust port configured to discharge exhaust gas therefrom. The combined cycle power plant includes a steam turbine system having a high pressure section, an intermediate pressure section and a low pressure section positioned on a common shaft. The combined cycle power plant includes a supercritical heat recovery steam generator including a duct defining an interior area and having a gas inlet and a gas outlet. The gas inlet is in communication with the exhaust port. The duct is configured to convey gas from the gas inlet to the gas outlet. A portion of the duct between the gas inlet and the gas outlet defines an exhaust gas flow segment of the interior area. The supercritical heat recovery steam generator includes a supercritical evaporator disposed in the interior area and a first stage reheater disposed in the interior area. The first stage reheater and the supercritical evaporator are disposed in the exhaust gas flow segment, adjacent to each other with respect to the flow of the exhaust gas, for example, in a parallel arrangement with respect to flow of exhaust gas through the supercritical heat recovery steam generator.

According to further aspects illustrated herein, there is provided a method for operating a combined cycle power plant. The method includes providing a gas turbine system having an exhaust port and a steam turbine system comprising a high pressure section. A supercritical heat recovery steam generator including a duct defining an interior area is also provided. The supercritical heat recovery steam generator includes an exhaust gas flow segment defined by a portion of the interior area. A supercritical evaporator and a first stage reheater are disposed in the interior area. The first stage reheater and the supercritical evaporator are disposed, adjacent to each other with respect to the flow if the exhaust gas, in the exhaust gas flow segment, for example, in a parallel arrangement with respect to the flow of exhaust gas through the supercritical heat recovery steam generator. Exhaust gas is discharged from the gas turbine system. Cold reheat steam is supplied from the steam turbine system to the first stage reheater and heated water is supplied to the supercritical evaporator. The exhaust gas is caused to flow in parallel flow paths around exterior surfaces defined by the first stage reheater and the supercritical evaporator, with respect to flow of exhaust gas through the supercritical heat recovery steam generator.

The above described and other features are exemplified by the following figures and in the detailed description.

BRIEF DESCRIPTION OF THE DRAWINGS

Referring now to the figures, which are exemplary embodiments, and wherein the like elements are numbered alike:

FIG. 2A is a schematic diagram of a portion of the HRSG of FIG. 1;

FIG. 2B is a schematic diagram of a portion of the HRSG of FIG. 1 illustrating another embodiment;

FIG. 2C is a schematic diagram of a portion of the HRSG of FIG. 1 illustrating another embodiment;

FIG. 2D is a schematic diagram of a portion of the HRSG of FIG. 1 illustrating another embodiment;

FIG. 3A is a schematic cross sectional view of a portion of the HRSG of FIG. 2A;

FIG. 3B is a schematic cross sectional view of a portion of another HRSG embodiment;

FIG. 3C is a schematic cross sectional view of a portion of another HRSG embodiment;

FIG. 3D is a schematic cross sectional view of a portion of another HRSG embodiment;

FIG. 4A is a schematic cross sectional view of a portion of the HRSG of FIG. 2A showing a stationary partition; and FIG. 4B is a schematic cross sectional view of a portion of the HRSG of FIG. 2A showing a movable partition.

DETAILED DESCRIPTION

Figure 1:
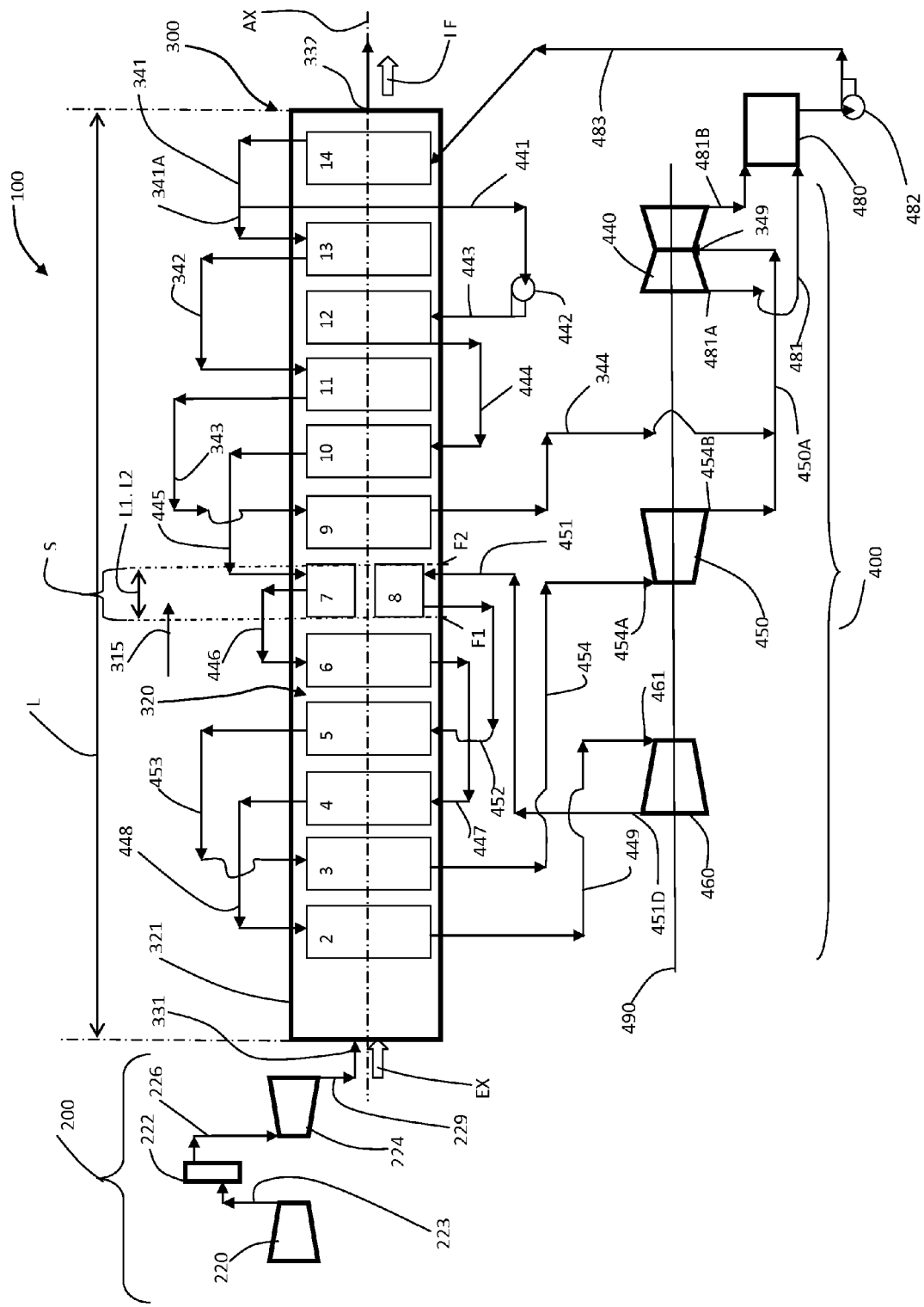
FIG. 1 is a schematic diagram of a combined cycle power plant including a gas turbine system, a Heat Recovery Steam Generator (HRSG) and a steam turbine system.

There is disclosed herein a combined cycle power plant generally designated by the number 100. The combined cycle power plant 100 includes a gas turbine system 200, in communication with a supercritical Heat Recovery Steam Generator (HRSG) 300. The HRSG 300 is in communication with a steam turbine system 400. The HRSG 300 includes a supercritical evaporator 7 arranged adjacent to a first stage reheater 8. The supercritical evaporator 7 and the first stage reheater 8 are disposed adjacent to each other in a common exhaust gas flow segment S defined by a portion of an interior area 320 defined by a duct 321 of the HRSG 300, with respect to flow of exhaust gas EX through the HRSG, as described herein. In one embodiment, the first stage reheater 8 and the supercritical evaporator 7 are disposed in the exhaust gas flow segment S, for example, in a parallel arrangement with respect to flow of exhaust gas through the supercritical HRSG 300.

As shown in FIG. 1 the gas turbine system 200 includes a compressor 220 in communication with a combustor 222 via a conduit 223. The combustor 222 is in communication with a turbine 224 via a conduit 226. The turbine 224 discharges exhaust gas as illustrated by the arrow EX via a conduit 229 which is in communication with an inlet 331 of the HRSG 300. As illustrated in FIG. 1, the steam turbine system 400 includes a high pressure section 460, an intermediate section 450 and a low pressure section 440 that are configured to rotate on a common shaft 490. The high pressure stage 460 defines a steam inlet 461 and a cold reheat steam outlet 451D. The intermediate section 450 defines a steam inlet 454A and a steam outlet 454B. The low pressure section 440 defines two steam inlets 481A and 481B and a steam outlet 349. The outlet 454B of the intermediate pressure section 450 is in communication with the inlet 349 of the low pressure section 440 via a crossover line 450A. The outlets 481A and 481B of the low pressure section 440 are in communication with a condenser 480. The condenser 480 is in communication with a pump 482 the discharge of which is in communication with the economizer 14 via line 483. While the steam turbine system 400 is described and shown as having three sections, namely, the high pressure section 460, the intermediate section 450 and the low pressure section 440, the present disclosure is not limited in this regard as the steam turbine system 400 may have more than three sections.

As illustrated in FIG. 1, the interior area 320 of the supercritical HRSG 300 extends a length L between the inlet 331 and an outlet 332 of the HRSG 300. The supercritical HRSG 300, in particular the duct 321, is configured to contain and direct the exhaust gas EX from the inlet 331 to the outlet 332 in the general direction of an arrow 315. Temperature of the exhaust gas decreases in the HRSG from the inlet 331 where the temperature is the greatest to the outlet the temperature is the lowest. The temperature reduction of the exhaust gas is effected by absorption of heat from a plurality of heat exchangers disposed in the HRSG 300, as described below. At the outlet 322 lower energy exhaust gas LE is discharged to a stack (not shown).

There are a plurality of heat exchangers, for example thirteen heat exchangers designated by the numerals 2, 3, 4, 5, 6, 7, 8, 9, 10, 11, 12, 13 and 14, disposed within the interior area 320 of the HRSG 300. The heat exchangers 2, 3, 4, 5, 6, 7, 8, 9, 10, 11, 12, 13 and 14 extract heat from the exhaust gas EX for use in heating feed water for the production of steam, for use in the steam turbine system 400 as described below. The heat exchangers 2, 3, 4, 5, 6, 7, 8, 9, 10, 11, 12, 13 and 14 are arranged in the interior area 320 from the inlet 331 to the outlet in the following order: a third stage high pressure steam superheater 2, a third stage steam reheater 3; a second stage high pressure steam superheater 4, a second stage steam reheater 5; a first stage high pressure steam superheater 6; a supercritical evaporator 7 and a first stage reheater 8 (e.g., a steam reheater) arranged in adjacent to one another; a second stage low pressure steam generator 9; a second stage high pressure economizer 10; a first stage low pressure steam generator 11; a first stage high pressure economizer 12; a low pressure evaporator 13; and an initial economizer 14.

The supercritical evaporator 7 is a heat exchanger such as a once through heat exchanger that is configured to increase the temperature of a fluid entering the heat exchanger from a temperature below the critical point to a temperature above the critical point. In one embodiment, the supercritical evaporator 7 is configured to increase the temperature of the fluid entering the heat exchanger from a temperature below the critical point to a temperature above the critical point without causing a phase change of the fluid.

The supercritical HRSG 300 includes three fluid loops, namely a low pressure steam generation loop, a reheat steam loop and a super critical high pressure loop, as defined as follows.

The low pressure loop includes the initial economizer 14 which is in communication with the low pressure evaporator 13 via line 341 and 341A. The low pressure evaporator 13 is in communication with the first stage low pressure steam generator 11 via a line 342. The first stage low pressure steam generator 11 in communication with the second stage low pressure steam generator 9 via a line 343. The second stage low pressure steam generator 9 includes a discharge line 344 for supplying steam to the inlet 349 of the low pressure stage 440 of the steam turbine system 400 via lines 344 and 450A.

The reheat loop includes the first stage reheater 8 which defines an inlet 451 for receiving cold reheat steam from a high pressure stage of the steam turbine system as described below. The first stage reheater 8 is in communication with the second stage steam reheater 5 via a line 452. The second stage steam reheater 5 is in communication with the third stage steam reheater 3 via a line 453. The third stage steam reheater 3 defines a discharge line 454 for supplying intermediate pressure steam to the inlet 454A of the intermediate section 450 of the steam turbine system 400 via line 454.

The high pressure loop includes the initial economizer 14 which is in communication with a pump 442 via the line 341 and a branch line 441. The pump 442 is in communication with the first stage high pressure economizer 12 via a line 443. The first stage high pressure economizer 12 is in communication with the second stage high pressure economizer 10 via a line 444. The second stage high pressure economizer 10 is in communication with the supercritical evaporator 7 via a line 445. The supercritical evaporator 7 is in communication with the first stage high pressure steam superheater 6 via a line 446. The first stage high pressure steam superheater 6 is in communication with the second stage high pressure steam superheater 4 via a line 447. The second stage high pressure steam superheater 4 is in communication with the third stage high pressure steam superheater 2 via a line 448. The third stage high pressure steam superheater 2 includes a discharge line 449 for supplying high pressure superheated steam to the inlet 461 of the high pressure stage 460 of the turbine system 400, via line 449. In one embodiment, the supercritical evaporator 7 is a once through steam generator.

As shown in FIG. 1, the supercritical evaporator 7 has a length L1 measured generally along a longitudinal axis AX of the supercritical HRSG 300. The length L1 extends between a first point F1 in the supercritical HRSG 300 and a second point F2 in the HRSG 300. The first stage reheater 8 has a length L2 measured generally along the longitudinal axis AX of the supercritical HRSG 300. The length L2 extends between the first point F1 and the second point F2 in the HRSG 300. In one embodiment, the length L1 is about equal to the length L2. An exhaust gas flow segment S of the interior area 320 of the supercritical HRSG 300 is defined between the first point F1 and the second point F2, wherein the exhaust gas flows through the exhaust gas flow segment S from the first point F1 to the second point F2. Both the supercritical evaporator 7 and the first stage reheater 8 are disposed in the exhaust gas flow segment S between the first point F1 and the second point F2. As shown in FIG. 1, both the supercritical evaporator 7 and the first stage reheater 8 are disposed in the common exhaust gas flow segment S defined between the first point F1 and the second point F2, adjacent to one another, relative to the flow of exhaust gas from the first point F1 to the second point F2. In one embodiment, the length of the exhaust gas flow segment S is equal to the length L1 and/or the length L2. In one embodiment, the length of the exhaust gas flow segment S is greater that the length L1 and/or the length L2, see for example FIG. 2D.

In the embodiment illustrated in FIGS. 1, 2A and 3A, the supercritical evaporator 7 is positioned above the first stage reheater 8. However, the present disclosure is not limited in this regard as other configurations can also be employed with both the supercritical evaporator 7 and the first stage reheater 8 disposed in the common exhaust gas flow segment S including, but not limited to, other arrangements such as the first stage reheater 8 being positioned above the supercritical evaporator 7 (see, for example, FIG. 2B); the supercritical evaporator 7 and the first stage reheater 8 being positioned side by side (see, for example, FIG. 3B); and the supercritical evaporator 7 and the first stage reheater 8 being positioned side by side or top/bottom configuration, with the supercritical evaporator 7 and/or the first stage reheater 8 being canted at an angle relative to one another or relative to a reference line (see, for example, FIG. 3C, wherein the first stage reheater 8 is canted at an angle D relative to a reference line RR), with both the supercritical evaporator 7 and the first stage reheater 8 disposed in the common exhaust gas flow segment S.

In the embodiment illustrated in FIG. 3D, the supercritical evaporator 7 and the first stage reheater 8 are disposed in the common exhaust gas flow segment S, arranged in parallel to one another with respect to flow of exhaust gas through the HRSG 300 and overlap one another wherein a portion IT of the supercritical evaporator 7 and the first stage reheater 8 are intertwined. Although the supercritical evaporator 7 and the first stage reheater 8 are described and shown in FIG. 3D as having a portion IT thereof intertwined and overlapping, the present disclosure is not limited in this regard as a substantial percentage or all of the supercritical evaporator 7 and the first stage reheater 8 can be intertwined or overlap without departing from the broader aspects disclosed herein.

As illustrated in FIGS. 2A-D, the arrangement of the supercritical evaporator 7 and the first stage reheater 8 in the common exhaust gas flow segment S is independent of the direction of fluid or steam flow through the supercritical evaporator 7 and the first stage reheater 8. For example, FIGS. 2A, 2C and 2D illustrate arrangements of the supercritical evaporator 7 and the first stage reheater 8 in the common exhaust gas flow segment S wherein a flow direction F7 of fluid or steam in the supercritical evaporator 7 is perpendicular to a flow direction F8 of fluid or steam in the first stage reheater 8. For example, FIG. 2B illustrates the arrangement of the supercritical evaporator 7 and the first stage reheater 8 in the common exhaust gas flow segment S wherein a flow direction F7 of fluid or steam in the supercritical evaporator 7 is parallel to a flow direction F8 of fluid or steam in the first stage reheater 8. In addition, FIG. 2D illustrates the arrangement of the supercritical evaporator 7 and the first stage reheater 8 in the common exhaust gas flow segment S wherein the supercritical evaporator 7 and the first stage reheater 8 are offset along the longitudinal axis AX by a distance L3.

In the embodiment illustrated in FIG. 4A a partition P, for example a baffle plate, is positioned in the interior area 320 of the duct 321, parallel to the flow direction of the exhaust gas EX, between the supercritical evaporator 7 and the first stage reheater 8, thereby defining a first flow area A11 around the supercritical evaporator 7 and a second flow area A10 around the first stage reheater 8. In one embodiment, the partition P is stationary. The partition P is positioned to cause a first portion 25Y of the exhaust gas EX to flow around a first exterior surface defined by the supercritical evaporator 7. The partition P also is positioned to cause a second portion 25Z of the exhaust gas EX to flow around a second exterior surface defined by the first stage reheater 8. In one embodiment, the first portion 25Y of the exhaust gas EX and the second portion 25Z of the exhaust gas EX are of about equal flow rates. In one embodiment, the first portion 25Y of the exhaust gas EX and the second portion 25Z of the exhaust gas EX are in proportion to heat absorption by the supercritical evaporator 7 and the first stage reheater 8, at full load conditions of the combined cycle power plant 100.

Referring to FIG. 4B, a partition PP is positioned in the interior area 320 of the duct 321 and parallel to the flow direction of the exhaust gas EX, as described herein. The partition PP includes a pivot P3 and a central member P4 extending between the supercritical evaporator 7 and the first stage reheater 8, parallel to the axis AX and parallel to the flow direction of the exhaust gas EX. The central member P4 extends from a point upstream of the supercritical evaporator 7 and the first stage reheater 8 to the pivot P3 which is positioned downstream of the supercritical evaporator 7 and the first stage reheater 8. A louver P1 (e.g., a damper) is pivotally connected to the pivot P3. The louver P1 is moveable, for example, rotatable about the pivot P3, as indicated by the arrow PA and defines a first flow area A21 around the supercritical evaporator 7 and defines a second flow area A21 around the first stage reheater 8, depending on the position of the louver P1. In one embodiment, the central member P4 is stationary. The louver P1 is selectively positioned to cause a first portion 25U of the exhaust gas EX to flow around a first exterior surface defined by the supercritical evaporator 7 and to cause the second portion 25T of the exhaust gas EX to flow around a second exterior surface defined by the first stage reheater 8, for example, proportionally, according to the position of the louver P1. While the louver is shown positioned towards the first stage reheater 8, the position of the louver is not limited this regard as the louver is movable in the direction shown by the arrow PA in response to an actuation signal. For example, the louver can be moved towards the supercritical evaporator 7. In one embodiment, the first portion 25Y of the exhaust gas EX and the second portion 25Z of the exhaust gas EX are in proportion to heat absorption by the supercritical evaporator 7 and the first stage reheater 8, at less than full load conditions of the combined cycle power plant 100. In one embodiment, the first portion 25U (e.g., flow rate) of the exhaust gas EX is greater than the second portion 25T (e.g., flow rate) of the exhaust gas EX. In one embodiment, the first portion 25U of the exhaust gas EX is less than the second portion 25T of the exhaust gas EX. Thus partition PP is configured and positioned to cause the first portion 25U (e.g., flow rate) and second portion 25T (e.g., flow rate) to be proportional to a first heat absorption of the first stage reheater 8 and a second heat absorption of the supercritical evaporator 7.

During operation of the combined cycle power plant 100, cold reheat steam is discharged from the cold reheat steam outlet 451D and supplied to the first stage reheater 8 via the line 451. Feed water from a high pressure economizer, for example the second stage high pressure economizer 10 is supplied to the supercritical evaporator 7 via the line 445.

The arrangement of the supercritical evaporator 7 and the first stage reheater 8 in the common exhaust gas flow segment S allows the exhaust gas EX to flow in parallel around an exterior heat transfer surface of the supercritical evaporator 7 and an exterior heat transfer surface of the first stage reheater 8. In one embodiment, the flow of exhaust gas EX is split between an area around the exterior heat transfer surface supercritical evaporator 7 and an area around the exterior heat transfer surface of the first stage reheater 8, in proportion to heat absorptions thereof.

As a result of analytical modeling, the inventor surprisingly discovered that arranging the supercritical evaporator 7 and the first stage reheater 8 in the common exhaust gas flow segment S in combined cycle power plants including super critical steam generation at pressures of about 3500 to 3600 psia, that increased efficiency is realized compared to those operating at about 4300 psia or more. Those skilled in the art of combined cycle power plants including super critical steam generation have been discouraged from arranging the supercritical evaporator 7 and the first stage reheater 8 in the common exhaust gas flow segment S because of the difficulty and complexity of the high pressure piping required to accommodate such an arrangement.

While the present invention has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A supercritical heat recovery steam generator comprising:
   a duct defining an interior area and having a gas inlet and a gas outlet, the duct being configured to convey gas from the gas inlet to the gas outlet, and a portion of the duct between the gas inlet and the gas outlet defining an exhaust gas flow segment of the interior area;
   a moveable partition positioned in the interior area;
   a supercritical evaporator disposed in the interior area;
   a first stage reheater disposed in the interior area; and
   the first stage reheater and the supercritical evaporator being disposed in the exhaust gas flow segment, adjacent to each other with respect to the flow of the exhaust gas,
   wherein the moveable partition is configured to adjust a volume between the supercritical evaporator and the first stage reheater within the interior area based on a load condition.

2. The supercritical heat recovery steam generator of claim 1, wherein:
   the exhaust gas flow segment has a first length extending along a longitudinal axis of the duct, from the gas inlet to the gas outlet;
   the supercritical evaporator has a second length extending along the longitudinal axis; and
   the first stage reheater has a third length extending along the longitudinal axis, the third length being approximately equal to the second length.

3. The supercritical heat recovery steam generator of claim 1, comprising:
   a high pressure economizer positioned between the supercritical evaporator and the gas outlet, the high pressure economizer being in fluid communication with the supercritical evaporator.

4. The supercritical heat recovery steam generator of claim 1, wherein the first stage reheater defines a steam inlet for receiving cold reheat steam from a high pressure turbine.

5. The supercritical heat recovery steam generator of claim 1, wherein the movable partition is positioned in the interior area and configured to cause a first flow rate of the gas around a first exterior surface defined by the first stage reheater and to cause a second flow rate of the gas around second exterior surfaces of the supercritical evaporator; and
   the movable partition positioned to cause the first flow rate and the second flow rate to be proportional to a first heat absorption of the first reheater and a second heat absorption of the supercritical evaporator.

6. The supercritical heat recovery steam generator of claim 5, wherein the position of the movable partition is initially set for full load conditions.

7. The supercritical heat recovery steam generator of claim 1, wherein:
the first stage reheater has steam flowing through a second interior area defined by the first stage reheater and the supercritical evaporator has a fluid flowing through a third interior area defined by the supercritical evaporator.

8. The supercritical heat recovery steam generator of claim 1, wherein the supercritical evaporator is a once through type.

9. A combined cycle power plant, comprising:
a gas turbine system having an exhaust port configured to discharge exhaust gas;
a steam turbine system comprising a high pressure section, an intermediate pressure section and a low pressure section positioned on a common shaft; and
a supercritical heat recovery steam generator comprising:
a duct defining an interior area and having a gas inlet and a gas outlet, the duct being configured to convey gas from the gas inlet to the gas outlet, and a portion of the duct between the gas inlet and the gas outlet defining an exhaust gas flow segment of the interior area;
a moveable partition positioned in the interior area;
a supercritical evaporator disposed in the interior area;
a first stage reheater disposed in the interior area; and
the first stage reheater and the supercritical evaporator being disposed in the exhaust gas flow segment, adjacent to each other with respect to the flow of the exhaust gas,
wherein the moveable partition is configured to adjust a volume between the supercritical evaporator and the first stage reheater within the interior area based on a load condition.

10. The combined cycle power plant of claim 9, wherein:
the exhaust gas flow segment has a first length extending along a longitudinal axis of the duct, from the gas inlet to the gas outlet;
the supercritical evaporator has a second length extending along the longitudinal axis; and
the first stage reheater has a third length extending along the longitudinal axis, the third length being approximately equal to the second length.

11. The combined cycle power plant of claim 9, comprising:
a high pressure economizer positioned between the supercritical evaporator and the gas outlet, the high pressure economizer being in fluid communication with the supercritical evaporator.

12. The combined cycle power plant of claim 9, wherein:
the high pressure section of the steam turbine system defines a cold reheat discharge line for conveying cold reheat steam therefrom; and
the first stage reheater defines steam inlet that is in communication with the cold reheat discharge line.

13. The combined cycle power plant of claim 9, wherein the partition is positioned in the interior area and configured to cause a first flow rate of the gas around a first exterior surface defined by the first steam reheater and to cause a second flow rate of the gas around second exterior surfaces of the supercritical evaporator; and
the moveable partition being positioned to cause the first flow rate and the second flow rate to be proportional to a first heat absorption of the first reheater and a second heat absorption of the supercritical evaporator.

14. The combined cycle power plant of claim 13, wherein the position of the moveable partition is initially set for full load conditions.

15. The combined cycle power plant of claim 9, wherein:
the first stage reheater has steam flowing through a second interior area defined by the first stage reheater and the supercritical evaporator has a fluid flowing through a third interior area defined by the supercritical evaporator.

16. The combined cycle power plant of claim 9, wherein the supercritical evaporator is a once through type.

17. A method for operating a combined cycle power plant comprising;
providing a gas turbine system having an exhaust port;
providing a steam turbine system comprising a high pressure section;
providing a supercritical heat recovery steam generator comprising a duct defining an interior area, a moveable partition positioned in the interior area, a supercritical evaporator disposed in the interior area and a first steam reheater disposed in the interior area, the first stage reheater and the supercritical evaporator being disposed, adjacent to each other with respect to the flow of the exhaust gas, in a common exhaust gas flow segment defined by a portion of the interior area;
moving the partition to adjust a volume between the supercritical evaporator and the first stage reheater within the interior area based on a load condition;
discharging exhaust from the gas turbine system;
supplying cold reheat steam from the steam turbine system to the first stage reheater; supplying a fluid to the supercritical evaporator; and
flowing the exhaust gas in parallel flow paths around exterior surfaces defined by the first stage reheater and the supercritical evaporator.

18. The method of claim 17 wherein the cold reheat steam and the fluid are at approximately equal temperatures.

* * * * *